United States Patent [19]

Gravley et al.

[11] Patent Number: 4,822,588
[45] Date of Patent: Apr. 18, 1989

[54] PROCESS FOR PRODUCING CARBON BLACK

[75] Inventors: Mark L. Gravley; E. Webb Henderson, both of Bartlesville, Okla.

[73] Assignee: Phillips Petroleum Company, Bartlesville, Okla.

[21] Appl. No.: 759,376

[22] Filed: Jul. 26, 1985

[51] Int. Cl.⁴ .................. C01B 31/02; C09C 1/48
[52] U.S. Cl. ..................... 423/450; 423/455; 423/456; 423/457
[58] Field of Search ............... 423/449, 450, 455, 456, 423/457

[56] References Cited

U.S. PATENT DOCUMENTS

| | | |
|---|---|---|
| 2,682,450 | 6/1954 | Sweigert et al. . |
| 2,781,247 | 2/1957 | Krejci . |
| 2,851,337 | 9/1958 | Heller . |
| 3,175,888 | 3/1965 | Krejci . |
| 3,222,136 | 12/1965 | Hess et al. . |
| 3,410,660 | 11/1968 | Henderson et al. . |
| 3,567,395 | 3/1971 | Henderson et al. ............... 23/259.5 |
| 3,642,446 | 2/1972 | Heller et al. . |
| 3,725,103 | 4/1973 | Jordan et al. . |
| 3,922,335 | 11/1975 | Jordan et al. ................. 423/450 |
| 3,952,087 | 4/1976 | Antonsen et al. . |
| 4,077,761 | 3/1978 | Dollinger et al. . |
| 4,105,750 | 8/1978 | Horn et al. . |
| 4,106,912 | 8/1978 | Dollinger et al. . |
| 4,241,022 | 12/1980 | Kraus et al. ..................... 422/156 |
| 4,289,743 | 9/1981 | Ruble, deceased ............. 423/450 |
| 4,294,814 | 10/1981 | Cheng . |
| 4,327,069 | 4/1982 | Cheng . |
| 4,383,973 | 5/1983 | Cheng ............................. 422/151 |
| 4,391,789 | 7/1983 | Estopinal ........................ 423/457 |
| 4,540,560 | 9/1985 | Henderson et al. ............. 423/445 |

FOREIGN PATENT DOCUMENTS

| | | |
|---|---|---|
| 0102072 | 3/1984 | European Pat. Off. . |
| 1359216 | 7/1974 | United Kingdom . |
| 2098972 | 10/1986 | United Kingdom . |

*Primary Examiner*—Gregory A. Heller
*Attorney, Agent, or Firm*—A. W. Umphlett

[57] ABSTRACT

A carbon black reactor is characterized by a converging zone, a throat, a first reaction zone and a second reaction zone serially connected. Oil can be injected both upstream and downstream of the throat. Annular walls connect the throat with the first reaction zone and the first reaction zone with the second reaction zone.

10 Claims, 1 Drawing Sheet

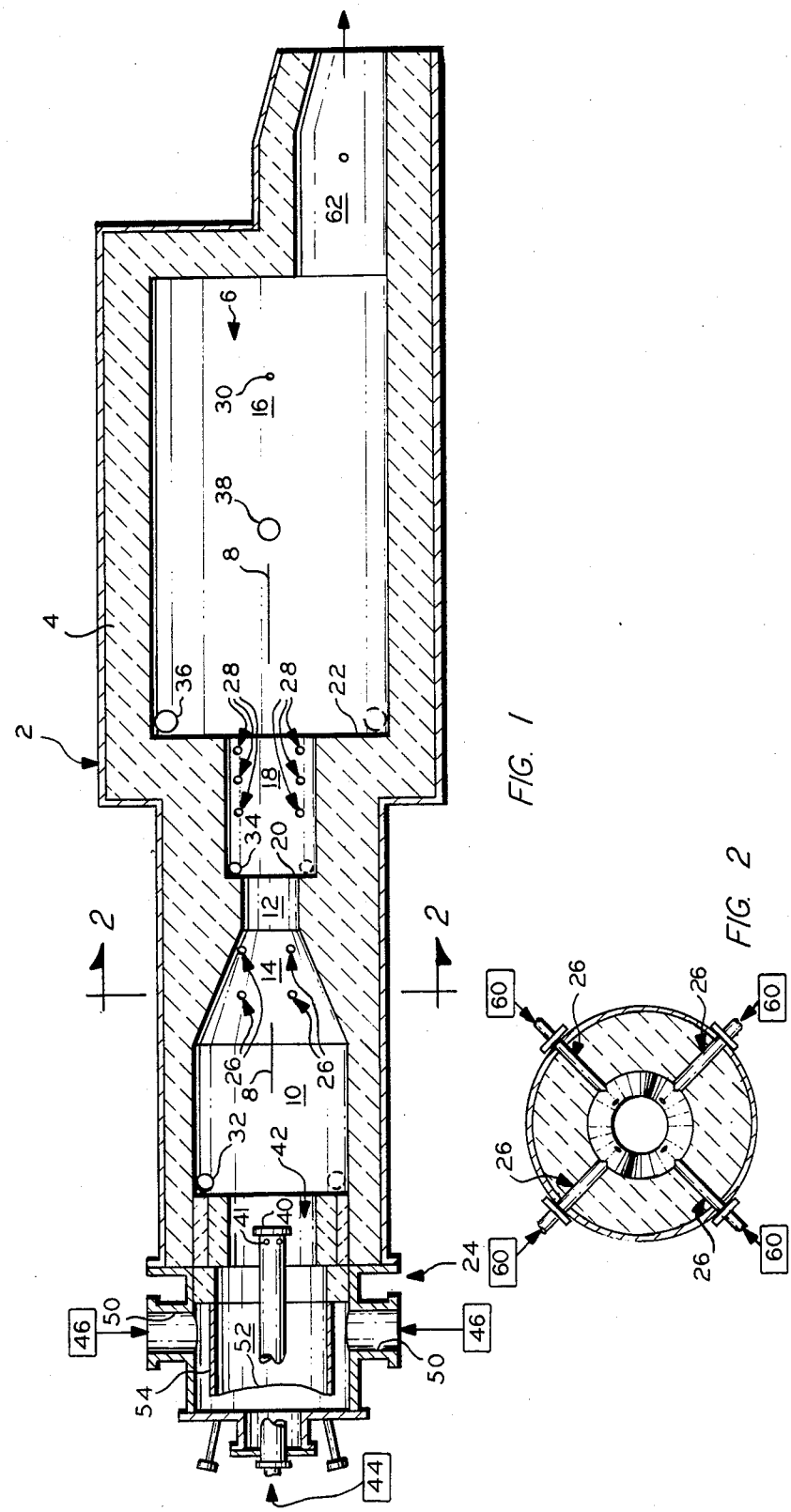

1

PROCESS FOR PRODUCING CARBON BLACK

BACKGROUND OF THE INVENTION

In one aspect, the invention relates to a process for producing carbon black. In another aspect, the invention relates to an apparatus for producing carbon black.

"Hard" or tread type carbon blacks having a surface area in the range of from about 70 to about 125 $m^2/g$ as measured by the CTAB method are usually produced by using a different process and reactor than that used for the production of "soft" or carcass type carbon black having a CTAB surface area in the range of about 25 to about 70 $m^2/g$. The necessity of having different reactors for different products is burdensome for carbon black plants and the desirability of a single reactor which could produce both types of blacks is manifest. Also, it has been noted that the yield of "soft" carbon black on the basis of oil feedstock used in generally lower than theoretical yield. A soft black reactor that provides higher yield or efficiency could provide cheaper product, and would thus be very desirable.

Grit is another problem in carbon black production. High grit levels in the carbon black product sometimes requires the purchase of micropulverizers as plant equipment. Grit is believed by some to have an adverse impact on compounding carbon black into rubber as well as eroding compounding equipment. Clearly a reactor and process that provide low grit levels in the carbon black product would be desirable.

A reactor which operates in a stable manner is clearly very desirable. The various process inputs must be changed when it is desired to switch over to a new product and the ability to duplicate earlier runs can provide substantial savings in manpower and reduce production of off-specification product.

OBJECTS OF THE INVENTION

It is the first object of this invention to provide a carbon black reactor that can produce both hard blacks and soft blacks.

It is another object of this invention to provide a carbon black reactor and process that provide high yields of carbon black product.

It is a further object of this invention to provide a reactor and process which operates in a stable manner and provides low grit levels in the final product.

SUMMARY OF THE INVENTION

In one embodiment of the invention, a carbon black reactor comprises a refractory sidewall which defines a reaction flow passage having a longitudinal axis. A combustion zone and a reactor throat are positioned along the longitudinal axis of the reactor and a converging zone converges from the combustion zone to the reactor throat. A quench zone is spaced apart from the reactor throat and has a cross sectional dimension of at least three times the cross sectional dimension of the reactor throat and a reaction zone connects the reactor throat with the quench zone. The reaction zone has a cross sectional dimension less than that of the quench zone and in the range of 1.2 to 3 throat diameters. The reaction zone has a length in the range of from 2 to 6 throat diameter. A first annular or near annular wall connects the reactor throat with the reaction zone. A second annular or near annular wall connects the reaction zone with the quench zone. A burner is operably associated with the combustion zone to cause axial flow of hot combustion gases from the combustion zone to the quench zone. At least one port for receiving an oil injector for introducing a carbonaceous feedstock radially inwardly toward the longitudinal axis of the reaction flow passage is provided through the side wall of the converging zone. Another at least one port for receiving an oil injector for introducing a carbonaceous feedstock generally radially inwardly toward the longitudinal axis of the reaction flow passage is provided through the side wall of the reaction zone. The reactor is further provided with a means for introducing quench fluid into the quench zone. By providing oil injectors in the ports on both sides of the reactor throat, carbon black can be produced at unexpectedly high efficiencies, especially soft carbon blacks, although both hard carbon blacks and soft carbon blacks can be produced by positioning injectors in either the converging or reaction zones. The annular or near annular walls separating the throat from the reaction zone and the reaction zone from the quench zone provide stable combustion and, provided that the ratio between the diameter of the quench zone and the reaction zone is sufficiently large, provides low levels of grit and minimal problems with carbon deposition on the inside of the reactor wall. By providing ports both upstream and downstream of the throat, the reactor is easily set up to produce hard or soft blacks, as desired. The reactor is capable of producing both hard and soft blacks at good efficiency.

In another aspect of the invention, a process is provided for producing carbon black. A hydrocarbon fuel is combusted with an excess amount of oxygen-containing gas to form a mass of hot combustion gases. These hot combustion gases are flowed through a converging zone and a carbonaceous feedstock is introduced generally radially inwardly into the hot combustion gases from the periphery of the converging zone to form a first reaction mixture. The first reaction mixtures flows through a reactor throat, past an abrupt expansion zone in the reaction flow passage at the downstream end of the throat and into the upstream end of a reaction zone. In the reaction zone, additional carbonaceous feedstock is introduced generally radially inwardly from the periphery of the reaction zone to form a second reaction mixture and the second reaction mixture is flowed past an abrupt expansion in the reaction flow passage at the downstream end of the reaction zone and into a quench zone which has a sufficiently large diameter and length to provide for the formation of the carbon black. The process can be carried out in the above described reactor if desired to produce both hard and soft blacks as desired with low levels of grit and high efficiencies.

BRIEF DESCRIPTION OF THE DRAWINGS

FIG. 1 illustrates a cross-sectional view of a carbon black reactor embodying certain features of the present invention.

FIG. 2 is a cross-sectional view of the reactor in FIG. 1 along lines 2—2 of FIG. 1.

DETAILED DESCRIPTION OF THE INVENTION

A carbon black reactor 2 comprises a refractory sidewall 4 for defining a reaction flow passage 6 having a plurality of zones positioned along a longitudinal axis 8. The sidewall 4 determines a combustion zone 10 and a reactor throat 12. A converging zone 14 converges from the combustion zone 10 to the reactor throat 12. A quench zone 16 is provided which has a cross sectional dimension of at least three times the cross sectional dimension of the reactor throat 12. A reaction zone 18 connects the reactor throat 12 with the quench zone 16. The reaction zone 18 has a cross sectional dimension less than that of the quench zone 16 and in the range of from about 1.2 to 3 throat diameters. The length of the reaction zone 18 is in the range of from 1 to 6 throat diameters. A first annular or near annular wall 20 connects the reactor throat 12 with the reaction zone 18. A second annular or near annular wall 22 connects the reaction zone 18 with the quench zone 16. A burner 24 is positioned for axial flow of combustion gases from the combustion zone 10 to the quench zone 16. At least one port for an oil injector 26 is provided for introducing a carbonaceous feedstock generally radially inwardly toward the longitudinal axis 8 of the reaction flow passage from the side wall of the converging zone 14. At least one port for an oil injector 28 is provided for introducing carbonaceous feedstock generally radially inwardly toward the longitudinal axis 8 of the reaction flow passage from the sidewall of the reaction zone 18. The reactor further comprises a means 30 for introducing a quench fluid into the quench zone. If desired, oxygen-containing gases can be introduced tangentially or radially into the reaction flow passage via one or more of the following: at least one tunnel 32 positioned at the upstream end of the combustion zone 10; at least one tunnel 34 positioned at the upstream end of the reaction zone 18; and/or via at least one tunnel 36 at the upstream end of the quench zone 16. Secondary air can also be introduced into the quench zone 16 if desired in a radial or tangential manner. For example, a radial tunnel 38 is shown emptying into the quench zone 16.

In a preferred embodiment, the combustion zone 10 has a generally cylindrical shape and a length in the range of from 2 to 5 reactor throat diameters. The converging zone 14 has a frustoconical shape and a length in the range of from 2 to 5 throat diameters. The reactor throat has a length in the range of from 0.2 to 2 reactor throat diameters, preferably 0.2-0.7 throat diameters. Preferably, at least two oil injectors 26 are positioned longitudinally spaced apart in the converging zone 14 and at least one oil injector is positioned in the reaction zone 18 through ports in the refractory material. Each of the oil injectors 26 is perfectly radially inwardly directed. The oil injectors in the converging zone are preferably located at a first longitudinal position with respect to the reaction flow passage and a second longitudinal position with respect to the reactor flow passage. The at least one generally radially inwardly directed oil injector in the reaction zone is positioned at a third longitudinal position with respect to the reactor axis.

The reaction zone 18 usually has a diameter in the range of from about 1.3 to about 2.7 times the diameter of the reactor throat. The reaction zone 18 will usually have a length sufficiently short so that the reacting mass is emitted from it before carbon forming reaction is complete. For example, a preferable length for the reaction zone 18 is in the range of from 2 to 5 reactor throat diameters. Preferably, the first wall 20 which connects the reaction zone with the reactor throat is annularly shaped. The wall 22 is also annularly shaped. The annularly shaped walls provide advantage by assisting in the disassociation of the oil particles for efficient pyrolysis. In a commercial size reactor, the diameter of the reactor throat 12 will usually be in the range of from 5 to 10 inches.

The burner 24 is axially directed into the combustion zone 10 from an upstream end thereof in a preferred embodiment of the invention. In this manner, hot combustion gases can be caused to flow axially from the combustion zone to the quench zone. One suitable burner can be formed by positioning a gas tube 40 in a tunnel 42 at the upstream end of the combustion zone 10. Fuel such as natural gas from a source 44 is emitted from the tube 40 via apertures 41 and is combusted with air from air sources 46. Good air distribution in the tunnel 42 is provided by causing the air from opposed tunnels 50 to flow in an annulus in the upstream direction and around lip 52 of a tubular gas distributor 54.

In another aspect, the invention provides a process for producing carbon black in a reaction flow passage. A hydrocarbon fuel such as from source 44 is combusted with excess amounts of oxygen containing gas such as air from source 46, generally in the range of 100 to 200% of the stoichiometric amount of air, to form a mass of hot combustion gases. These hot combustion gases are flowed through a converging zone such as zone 14. A carbonaceous feedstock is introduced generally radially inwardly into the hot combustion gases from the periphery of the converging zone to form a first reaction mixture. The first reaction mixture flows through the reactor throat, past an abrupt upstream expansion in the reaction flow passage at the downstream end of the throat and into the upstream end of a reaction zone. In the reaction zone additional carbonaceous feedstock is introduced generally radially inwardly into the reaction mixture from the periphery of the reaction zone to form a second reaction mixture and this second reaction mixture flows past the second expansion in the reaction flow passage 6 and into a quench zone 16. The quench zone 16 has a sufficiently large diameter and a length to provide for the formation of carbon black from the resulting pyrolysis of the second reaction mixture.

The required inputs of oxygen-containing gas, which is usually air; fuel, which is preferably natural gas although oil can also be used, and carbonaceous feedstock such as a residual oil having a high carbon content as measured, for example, by BMCI depends on the size of the reactor throat 12. Where R is the radius of the reactor throat in inches, the combustion gas flow rate is usually in the range of from about 9,000 $R^2$ to 25,000 $R^2$, preferably in the range 11,000 $R^2$–19,000 $R^2$, the combustion gas flow rate being expressed in terms of standard cubic feet per hour (SCFH) at 1 atmosphere and 60° F. Hard blacks are better produced at the higher flow rates in the range. The charge rate of the carbonaceous feedstock is dependent upon the type of carbon black desired, the air/fuel ratio, the oil BMCI value, etc. but will generally be most closely related to the air rate. The oil rate will usually provide an air/oil ratio in the range of 250:1 to 750:1 SCF/Gal. At least when producing low surface area blacks, such as blacks having a surface area in the range of 25 to 70 $m^2/g$, it is advantageous to inject the oil on both sides of the reactor throat 12. For example, improved yield will result when the reactor is operated at an air/oil ratio in the range of 250:1 to 500:1 SCF/Gal. and feedstock injection is in both the converging and reaction zones. The most upstream position of carbonaceous feedstock injection will generally be separated from the most downstream position by distance in the range of from 2 to about 7 throat diameters. Preferably, the distance separating the most upstream from the most downstream position of carbonaceous feedstock injection will be in the range of from 3 to 6 reactor throat diameters so that the oil from the downstream injector contacts reactive particles from the upstream injector(s). Based on the examples herein, it appears that best results are obtained when combusting the fuel with from 100 to 150%, for example, about 120%, of the amount of oxygen-containing gas required for stoichiometric combustion.

It is generally desirable to scavenge heat from the process where possible. One manner in which this can be done is to preheat the air charged to the reactor. By indirectly exchanging heat with reactor tail gas, the air charge becomes preheated, frequently to a temperature within the range of 500° to 800° C.

Experiments have shown that providing the oil injectors with spray tips so that a cone-shaped spray of feedstock is emitted from each produces black at higher efficiency than where coherent jets of feed are used although the present invention is not limited to sprays or jets of feedstock. For best results, it is recommended that oil injector each emit a cone-shaped spray of feedstock. A wide cone angle is preferred, such as a cone angle in the range of from 60° to 120°.

The quench fluid is usually supplied to the quench zone in an amount sufficient to reduce the temperature of the reactor gases to below about 1800° F. and terminate the carbon forming reaction. In a commercial unit, the quench fluid will be introduced at a distance in the range of from about 10 to about 30 throat diameters from the outlet of the reactor throat. By providing a plurality of longitudinally spaced ports for the positioning of the quench injector at a desired location the photolometer of the carbon black product can be controlled. It is important that the quench zone 16 not be so large that liquid water begins to accumulate therein because of low gas velocities. There is thus a practical upper limit to the diameter of the quench zone 18 which can be varied to some extent by the use of bifluid nozzles for the introduction of quench fluid for example.

In a preferred embodiment of the invention the reaction zone has a diameter in the range of from 1.1 to 3.0 throat diameters and the quench zone has a diameter in the range of from 3 to 10 reactor throat diameters. In a reactor which was tested with good results, the reaction zone had a diameter of about 1.8 times the throat diameter and the quench zone had a diameter of about 6.7 times the throat diameter. The lower limit to the diameter of the quench zone is set by the occurrence of carbon deposits. In a reactor that was tested in which the quench zone had a diameter of 2.8 times the throat diameter carbon deposits were a severe problem. After quenching, the reactor efluent can be withdrawn via tail pipe 62 and processed in conventional equipment.

EXAMPLE

Runs were made in a pilot plant sized apparatus similar to that shown in FIGS. 1 and 2. The reactor throat had a diameter of 1.7 inches. The reaction zone had a diameter of 3 inches. The quench zone had a diameter of 12 inches. The throat was 1 inch long. The reaction zone was 6 inches long. An axial quench nozzle was positioned about 15 feet downstream from the throat outlet. Radial oil injection was selected from positions 4 inches upstream from the throat outlet (4), 2 inches upstream from throat outlet (2), and 4½ inches downstream from throat outlet (-5). The oil was emitted through orifices ranging from 0.028" to 0.046" as shown. Provision was made for supplying tangential air to the upstream end of the reaction zone and radial secondary air 76 inches downstream from throat outlet and 108 inches downstream from throat outlet. A two-stage converging zone was employed, the upstream stage had an upstream diameter of 6.0" and a length of 2" to a downstream diameter of 4.5". The downstream portion had an upstream diameter of 4.5" and a length of 13" to a downstream diameter at the throat of 1.7". Runs made in this reactor are summarized in the following table. An Air jacket was provided around the gas tube for cooling.

TABLE I

| | | Run | | | | | | | | |
|---|---|---|---|---|---|---|---|---|---|---|
| | | 1 | 2 | 3 | 4 | 5 | 6 | 7 | 8 | 9 |
| Prim Air, | SCFH | 13790 | 13790 | 13790 | 13790 | 13790 | 13790 | 11820 | 9850 | 7880 |
| | °C. | 558 | 562 | 560 | 561 | 563 | 561 | 558 | 563 | 563 |
| Jacket Air, | SCFH | 394 | 394 | 394 | 394 | 394 | 394 | 394 | 394 | 394 |
| Tang Air, | SCFH | 0 | 0 | 0 | 0 | 0 | 0 | 0 | 0 | 0 |
| Sec. Air, | SCFH | 0 | 0 | 158 | 2172 | 0 | 1478 | 0 | 0 | 0 |
| | Location | — | — | 68 | 68 | — | 108 | — | — | — |
| Total Air, | SCFH | 14184 | 14184 | 14342 | 16356 | 14184 | 15662 | 12214 | 10244 | 8274 |
| Gas Rate, | SCFH | 933 | 933 | 933 | 933 | 933 | 933 | 800 | 667 | 533 |
| Air/Gas Ratio | | 15.2 | 15.2 | 15.4 | 15.2 | 15.2 | 15.2 | 15.3 | 15.4 | 15.5 |
| Oil Rate, | gph | 23.17 | 41.28 | 41.53 | 44.86 | 41.39 | 43.27 | 34.56 | 29.04 | 23.75 |
| A/O, | scf/gal | 612 | 344 | 342 | 316 | 343 | 328 | 353 | 353 | 348 |
| Oil Tubes | | 2-.039 | 2-.042 | 2-.042 | 2-.062 | 2-.042 | 2-.046 | 2-.042 | 2-.042 | 2-.039 |
| Location | | 4 | 4 | 4/−5 | 4 | −5 | −5 | −5 | −5 | −5 |
| Pressure, psig | | 70 | 131 | 70–80 | 46 | 130 | 90 | 99 | 68 | 70 |
| Temp °C. | | 156 | 163 | 158 | 162 | 162 | 163 | 156 | 154 | 155 |
| Yield, | lb/gal | 4.83 | 6.42 | 6.37 | 6.29 | 6.60 | 6.39 | 6.45 | 6.42 | 6.42 |
| | % Total C | 50.1 | 71.2 | 70.7 | 70.3 | 73.2 | 71.2 | 71.3 | 71.1 | 71.2 |
| $I_2No$ (ASTM D 1510 76) | | 117 | 39 | 44 | 40 | 35 | 37 | 36 | 38 | 37 |
| CTAB (ASTM D 3765 80) | | 113 | 43 | 49 | 44 | 40 | 39 | 42 | 42 | 42 |
| 24M4 (ASTM D 3493 76) | | 107 | 93 | 96 | 93 | 89 | 88 | 89 | 90 | 89 |
| Grit (ASTM D 1514-80) 325 sieve, wt % | | — | — | — | — | .0020 | .0006 | .0004 | .0003 | .0006 |

| | | Run | | | | | | | | |
|---|---|---|---|---|---|---|---|---|---|---|
| | | 10 | 11 | 12 | 13 | 14 | 15 | 16 | 17 | 18 |
| Prim Air, | SCFH | 13790 | 13790 | 13790 | 13790 | 13790 | 13790 | 13790 | 13790 | 14381 |
| | °C. | 560 | 562 | 562 | 562 | 413 | 28 | 564 | 564 | 563 |
| Jacket Air, | SCFH | 394 | 394 | 394 | 394 | 394 | 394 | 394 | 394 | 394 |

TABLE I-continued

| | | | | | | | | | | |
|---|---|---|---|---|---|---|---|---|---|---|
| Tang Air, | SCFH | 394 | 591 | 0 | 0 | 0 | 0 | 0 | 0 | 0 |
| Sec. Air, | SCFH | 0 | 0 | 0 | 0 | 0 | 0 | 0 | 0 | 0 |
| | Location | — | — | — | — | — | — | — | — | — |
| Total Air, | SCFH | 14578 | 14775 | 14184 | 14184 | 14184 | 14184 | 14184 | 14184 | 14775 |
| Gas Rate, | SCFH | 933 | 933 | 933 | 933 | 933 | 933 | 609 | 609 | 933 |
| Air/Gas Ratio | | 15.2 | 15.2 | 15.2 | 15.2 | 15.2 | 15.2 | 23.3 | 23.3 | 15.2 |
| Oil Rate, | gph | 43.27 | 42.99 | 43.56 | 43.56 | 36.84 | 26.93 | 41.27 | 41.97 | 42.87 |
| A/O, | scf/gal | 328 | 330 | 326 | 326 | 385 | 527 | 344 | 338 | 345 |
| Oil Tubes | | 2-.046 | 2-.046 | 2-.046 | 2-.046 | 2-.046 | 2-.046 | 2-.046 | 2-.046 | 2-.046 |
| Location | | −5 | −5 | −5 | −5 | −5 | −5 | 4 | 4 | 4 |
| Pressure, psig | | 93 | 93 | 140 | 130 | 107 | 60 | 95 | 97 | 98 |
| Temp °C. | | 162 | 163 | 162 | 161 | 162 | 159 | 160 | 160 | 161 |
| Yield, | lb/gal | 6.45 | 6.43 | 6.57 | 6.57 | 6.35 | 5.67 | 5.88 | 5.92 | 6.34 |
| | % Total C | 71.8 | 71.6 | 73.1 | 73.2 | 69.7 | 60.1 | 67.2 | 67.8 | 70.5 |
| $I_2No$ | | 38 | 35 | 36 | 36 | 38 | 36 | 41 | 39 | 45 |
| CTAB | | 41 | 41 | 40 | 40 | 41 | 39 | 44 | 42 | 49 |
| 24M4 | | 87 | 88 | 88 | 88 | 88 | 82 | 87 | 86 | 92 |
| Grit | | .0020 | .0004 | .0005 | .0004 | .0002 | .0004 | .0016 | .0010 | .0030 |

| | | Run | | | | | | | | |
|---|---|---|---|---|---|---|---|---|---|---|
| | | 19 | 20 | 21 | 22 | 23 | 24 | 25 | 26 | 27 |
| Prim Air, | SCFH | 7880 | 13647 | 13645 | 13667 | 13870 | 13849 | 13858 | 13865 | 13862 |
| | °C. | 565 | 563 | 562 | 561 | 564 | 559 | 561 | 562 | 560 |
| Jacket Air, | SCFH | 394 | 380 | 391 | 391 | 395 | 396 | 396 | 397 | 396 |
| Tang Air, | SCFH | 0 | 0 | 0 | 0 | 0 | 0 | 0 | 0 | 0 |
| Sec. Air, | SCFH | 0 | 0 | 0 | 0 | 0 | 0 | 0 | 0 | 0 |
| | Location | — | — | — | 0 | 0 | 0 | 0 | 0 | 0 |
| Total Air, | SCFH | 8274 | 14026 | 14035 | 14058 | 14265 | 14246 | 14255 | 14262 | 14258 |
| Gas Rate, | SCFH | 533 | 1162 | 1161 | 1160 | 1085 | 1058 | 1150 | 1163 | 1163 |
| Air/Gas Ratio | | 15.5 | 12.1 | 12.1 | 12.1 | 13.1 | 13.5 | 12.4 | 12.3 | 12.3 |
| Oil Rate, | gph | 15.94 | 38.32 | 38.32 | 38.88 | 41.39 | 41.74 | 38.83 | 38.32 | 32.05 |
| A/O, | scf/gal | 519 | 366 | 366 | 362 | 345. | 341 | 367 | 372 | 445 |
| Oil Tubes | | 2-.039 | 2-.046 | 2-.028/ 2-.039 | 2-.046 | 2-.046 | 2-.046 | 2-.046 | 2-.046 | 2-.046 |
| Location | | 4 | −5 | 2/−5 | −5 | −5 | −5 | 4/−5 | 4 | 4/−5 |
| Pressure, psig | | 40 | 70 | 50 | 93 | 100 | 110 | 80 | 85 | 50 |
| Temp °C. | | 185 | 157 | 160 | 160 | 161 | 162 | 159 | 160 | 156 |
| Yield, | lb/gal | 5.32 | 6.78 | 6.59 | 6.77 | 6.69 | 6.62 | 6.54 | 6.51 | 6.20 |
| | % Total C | 56.7 | 72.8 | 70.7 | 72.8 | 73.1 | 72.6 | 70.6 | 70.0 | 65.3 |
| $I_2No$ | | 100.5 | 40 | 52 | 40 | 42 | 38 | 50 | 47 | 71 |
| CTAB | | 90 | 42 | 54 | 44 | 42 | 42 | 57 | 50 | 72 |
| 24M4 | | 100 | 89 | 99 | 92 | 90 | 90 | 100 | 91 | 102 |
| Grit | non magnetic | .0010 | .0007 | .0012 | .0004 | .0009 | 0 | .0005 | .0010 | |
| | total | .0031 | .0066 | .0027 | .0009 | .0015 | 0 | .0005 | .0015 | |

Injection of oil upstream and downstream of the venturi throat seems to give much higher efficiency as indicated by the higher CTAB value for the black produced. Compare runs 3 with 2 and 5, and 21 with 20 and 26 and 25 with 22 and 26. This shows the unexpected result that splitting the oil improves soft black reactor efficiency because it produces higher CTAB at essentially the same input conditions. In fact, the first test of oil in both locations was made in a deliberate effort to produce a lower CTAB black. This "split oil" mode was also tested when producing a low surface area hard black (run 27). The improvement in efficiency when splitting the oil streams is definite at high oil rates and low surface areas.

That which is claimed is:

1. A process for producing carbon black in a reaction flow passage having an upstream end, a converging zone, a reactor throat, a reaction zone, a quench zone, and a downstream end, said process comprising:
    (a) combusting a hydrocarbon fuel with excess amounts of oxygen-containing gas to form a mass of hot combustion gases containing free oxygen and flowing generally axially from the upstream end toward the downstream end of the reaction flow passage;
    (b) flowing the mass of hot combustion gases through the converging zone;
    (c) introducing a carbonaceous feedstock generally radially inwardly into the hot combustion gases at a position from the periphery of the converging zone to form a first reaction mixture;
    (d) flowing the first reaction mixture through the reactor throat, wherein the reactor throat has a radius and a diameter of two times the radius, past a first abrupt expansion in the reaction flow passage at a downstream end of the reactor throat, and into an upstream end of the reaction zone, said first abrupt expansion connecting the reactor throat with the reaction zone;
    (e) introducing additional carbonaceous feedstock generally radially inwardly into the reaction mixture at a position from the periphery of the reaction zone to form a second reaction mixture; and
    (f) flowing the second reaction mixture past a second abrupt expansion in the reaction flow passage at a downstream end of the reaction zone and into a quench zone having a sufficiently large diameter and length to provide for the formation of carbon black.

2. A process as in claim 1 wherein the oxygen-containing gas comprises air; wherein the fuel is combusted with from 100% to 200% of the stoichiometric amount of air, wherein the combustion gas flow rate (SCFH) is in the range of 9,000 $R^2$ to 25,000 $R^2$, where R is the radius of the reactor throat in inches; and wherein sufficient gallons of carbonaceous feedstock in the form of oil is introduced into the combustion gases so as to provide an air:oil charge ratio to the process in the range of 250:1 to 750:1 SCF/Gal.

3. A process as in claim 1 wherein the most upstream position of carbonaceous feedstock injection is separated from the most downstream position of carbonaceous feedstock injection by a distance in the range of from 2 to 7 times the diameter of the reactor throat.

4. A process as in claim 3 wherein the distance separating the most upstream position of carbonaceous of carbon black from the most downstream position of carbonaceous feedstock injection is in the range of from 3 to 6 times the diameter of the reactor throat.

5. A process as in claim 3 wherein the fuel is combusted with from 100% to 150% of the stoichiometric amount of oxygen-containing gas.

6. A process as in claim 5 wherein the combustion gas flow rate (SCFH) is in the range of 11,000 $R^2$ to 19,000 $R^2$ where R is the radius of the reactor throat in inches.

7. A process as in claim 6 wherein the oxygen-containing gas comprises preheated air at a temperature in the range of from 500° to 800° C. and the air:oil charge ratio is in the range of 250:1 to 500:1 SCF/Gal.

8. A process as in claim 7 wherein the carbonaceous feedstock is introduced from oil injectors each emitting a cone-shaped spray of feedstock.

9. A process as in claim 8 further comprising introducing quench fluid into the quench zone at a distance in the range of 10–30 throat diameters from the downstream end of the reactor throat.

10. A process as in claim 9 wherein the reaction zone has a diameter in the range of 1.1–3.0 throat diameters and the quench zone has a diameter in the range of 3–10 throat diameters.

* * * * *

UNITED STATES PATENT AND TRADEMARK OFFICE
CERTIFICATE OF CORRECTION

PATENT NO.   : 4,822,588
DATED        : April 18, 1989
INVENTOR(S)  : MARK L. GRAVLEY and E. WEBB HENDERSON It is certified that error appears in the above-identified patent and that said Letters Patent is hereby corrected as shown below:

Column 9, lines 10-15, claim 4, should read as follows:

-- 4. A process as in claim 3 wherein the distance separating the most upstream position of carbonaceous feedstock injection from the most downstream position of carbonaceous feedstock injection is in the range of from 3 to 6 times the diameter of the reactor throat.--.

Signed and Sealed this

First Day of October, 1991

Attest:

HARRY F. MANBECK, JR.

Attesting Officer

Commissioner of Patents and Trademarks